United States Patent [19]
Benton

[11] Patent Number: 5,632,294
[45] Date of Patent: May 27, 1997

[54] LOCKING BALL VALVE FOR A FLUID CONDUIT

[75] Inventor: Frances H. Benton, Harrisville, N.H.

[73] Assignee: Scully Signal Company, Wilmington, Mass.

[21] Appl. No.: 669,639

[22] Filed: Jun. 24, 1996

[51] Int. Cl.$^6$ .................. F16K 5/06; F16K 35/00
[52] U.S. Cl. ................ 137/1; 251/94; 251/95; 251/315.01; 251/315.16
[58] Field of Search ................ 137/1; 251/93, 251/94, 95, 297, 315.01, 315.16

[56] References Cited

U.S. PATENT DOCUMENTS

| | | | |
|---|---|---|---|
| 536,053 | 3/1895 | Waldron | 251/94 |
| 537,773 | 4/1895 | Hoy et al. | 251/94 |
| 538,299 | 4/1895 | Tower et al. | 251/94 |
| 566,636 | 8/1896 | Waldron | 251/94 |
| 857,194 | 6/1907 | Pabst et al. | 70/176 |
| 1,643,753 | 9/1927 | Slattery | 137/625.48 |
| 1,666,478 | 4/1928 | Supplee | 251/94 |
| 1,719,678 | 7/1929 | Swearingen | 251/94 |
| 2,346,892 | 4/1944 | Aldrich | 251/297 |
| 2,499,022 | 2/1950 | Franck | 137/556 |
| 2,616,503 | 11/1952 | Armentrout | 166/104 |
| 2,657,709 | 11/1953 | Gillerstrom et al. | 137/614.2 |
| 3,036,811 | 5/1962 | Fry | 251/160 |
| 3,068,903 | 12/1962 | Haenky et al. | 137/630.22 |
| 3,205,922 | 9/1965 | Davis et al. | 141/209 |
| 3,385,321 | 5/1968 | Ehrens et al. | 137/625.46 |
| 3,406,943 | 10/1968 | Newell | 251/163 |
| 3,464,449 | 9/1969 | Morton | 137/625.64 |
| 4,146,018 | 3/1979 | Aldridge et al. | 251/297 |
| 4,548,237 | 10/1985 | Bogenschutz | 251/315.16 |
| 5,413,310 | 5/1995 | Horvei | 251/94 |

FOREIGN PATENT DOCUMENTS

| | | | |
|---|---|---|---|
| 335422 | 1/1904 | France | 251/94 |
| 454476 | 12/1927 | Germany | 251/94 |
| 4321885 | 11/1992 | Japan | 251/315.16 |

*Primary Examiner*—George L. Walton
*Attorney, Agent, or Firm*—Bookstein & Kudirka, P.C.

[57] ABSTRACT

A locking valve for controlling fluid flow within a conduit has a spring-biased detent in fluid communication with a fluid source. A movable valve structure prevents fluid flow through the conduit in a closed position and enables fluid flow through the conduit in an open position. Movement of the valve structure from the closed position to the open position is obstructed by the detent when fluid pressure in the conduit is below a predetermined pressure. An increase in fluid pressure, however, moves the detent against the spring bias, removing the obstruction to movement of the valve structure, and allowing the valve structure to be moved to the open position. Thus, accidental or intentional drainage of the conduit when the fluid pressure source is inactive is avoided.

20 Claims, 3 Drawing Sheets

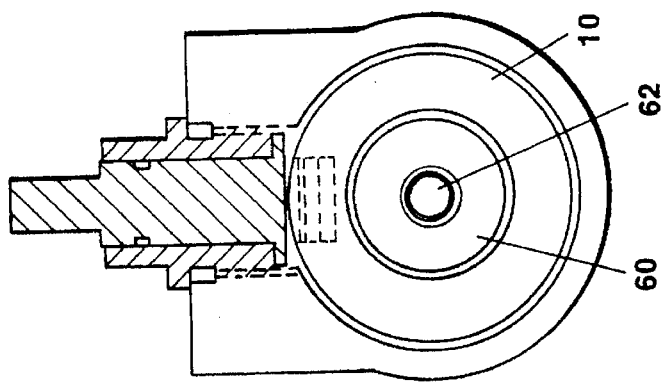
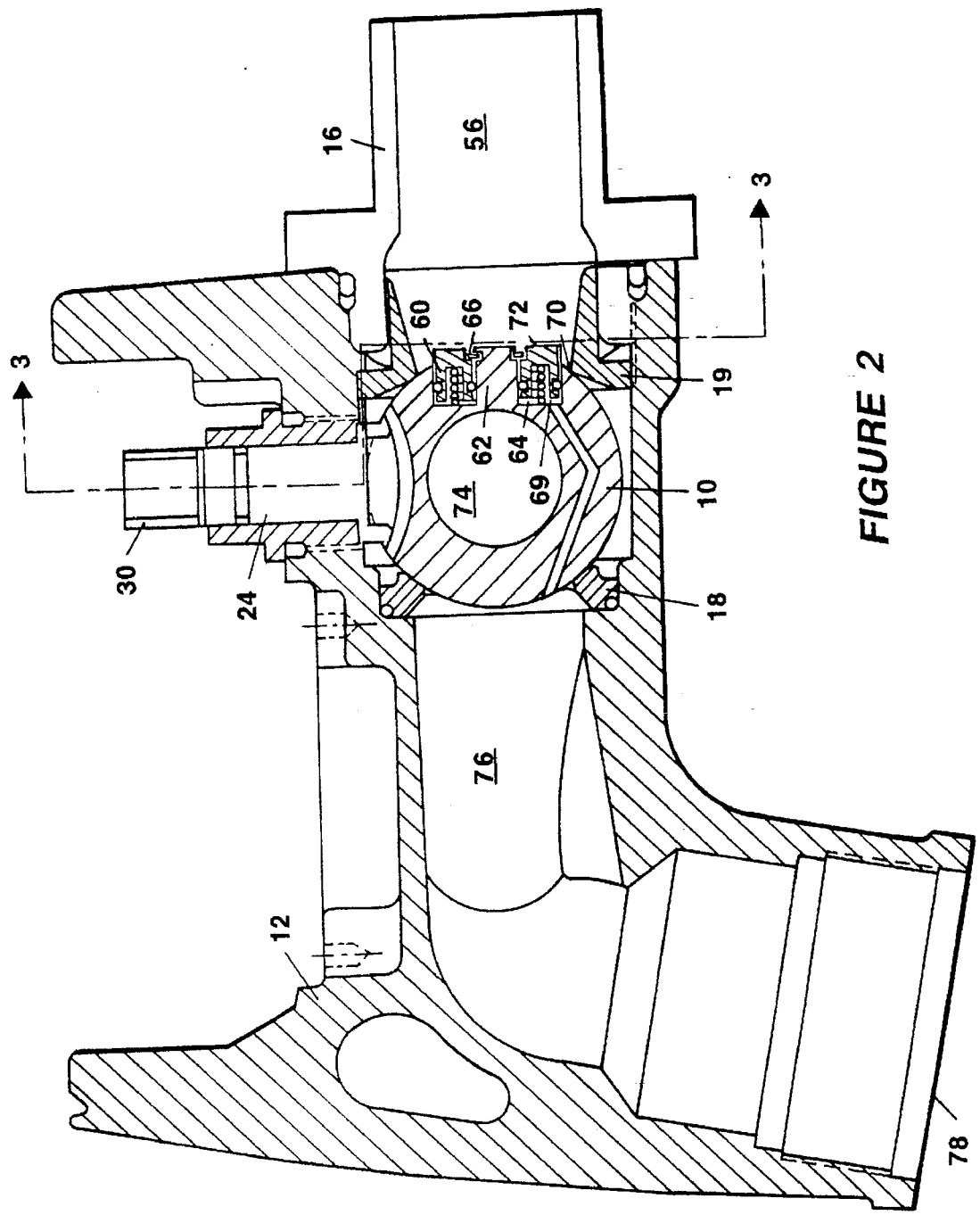
FIGURE 2
FIGURE 3

LOCKING BALL VALVE FOR A FLUID CONDUIT

BACKGROUND OF THE INVENTION

This invention relates to the field of valves for fluid conduits and, more particularly, to controlling the accidental or intentional drainage of fluid from a fluid conduit.

Prior to the present invention, conduits for delivering fluids have included a ball valve having a hole through its center that can be rotated to close the conduit to fluid flow or to open the conduit to fluid flow. Such a fluid delivery system is common for fuel delivery where fuel is delivered through a flexible conduit having a nozzle at one end. The flexible conduit is usually stored by winding it about a drum. The nozzle also commonly contains a spring-loaded check valve which functions as both an anti-theft device and an anti-drip device. The check valve is intended to prevent fuel from leaking or being intentionally drained from the conduit when the pump utilized to pressurize the fuel is inactivated. When the pump is inactivated, a meter for measuring the quantity of fuel delivered also is inactivated. By preventing drainage of fuel from the hose when the pump is inactive, the next customer of the fuel does not pay for the conduit to be filled before fuel is added to their tank. The check valve is effective for preventing such drainage of the conduit after fuel delivery is completed. The check valve also functions as an anti-drip device since it retains fuel within the conduit when the conduit is lifted at an intermediate point along its length while deploying or storing the conduit.

While the check valve provides some advantage to the user, its presence also is disadvantageous. First, the check valve restricts flow of fluid through the nozzle thereby increasing the time necessary to deliver a given quantity of fuel. Secondly, the check valve chatters, sometimes violently, during use. That is, the extent to which the check valve is opened depends upon conditions of fluid pressure and fluid velocity at the check valve. The chatter occurs when pressure in the conduit increases enough to open the check valve, but as the check valve opens, fluid velocity increases, and fluid pressure decreases, so that the check valve tends to close again. The variance of the check valve from a condition tending to open it to a condition tending to close it causes the chatter.

Accordingly, it would be desirable to provide a valve apparatus for a conduit which can prevent the intentional or accidental drainage of fluid from the conduit, without the attendant disadvantages of a check value.

SUMMARY OF THE INVENTION

The present invention provides a locking ball valve which, when in a closed position, is locked in position absent sufficient fluid pressure within a conduit to which the valve is connected, and which can be unlocked by a force exerted by pressurized fluid within the conduit. After being unlocked, the ball valve can be rotated to an open position which permits fluid flow through the conduit. Preferably, the valve is positioned adjacent a nozzle which dispenses fluid from the conduit when the valve is open and the fluid is pumped through the conduit.

A ball structure of the ball valve is positioned within a seat structure, and has a detent locking button secured to it. The locking button is spring-loaded in a manner which biases the locking button in an outward direction relative to a center of the ball. When the ball valve is in the closed position, and the button is not depressed, the button extends beyond an outer surface of the ball, and obstructs rotation of the ball, thereby locking the ball in the closed position. However, the locking button can be depressed against the spring bias by a force exerted by pressurized fluid within the conduit. Under sufficient fluid pressure, the locking button is recessed at or below the outside surface of the ball structure, thereby unlocking the ball valve, and permitting the ball to be rotated within the seating structure. When rotated to the open position, fluid is allowed to pass from the conduit through the ball structure and out the nozzle.

The button may be any of a number of desired shapes and, in one particular embodiment, is annular, providing a large surface area to receive the pressure of the fluid and to allow securing to a post about which the button is located. A vent can also be provided in conjunction with the locking button to permit fluid between the locking button and the ball to be vented when the button is depressed. As fluid pressure within the conduit forces the locking button toward the center of the ball (against the pressure of the spring) fluid previously located between the button and the ball structure is forced out through the vent. In addition, a seat which prevents rotation of the ball structure from the closed position to the open position when the button is not depressed, may be angled in a manner which allows gradual depression of the button against the spring bias as the ball structure is rotated from the open position to the closed position.

BRIEF DESCRIPTION OF THE DRAWINGS

FIG. 2 is a cross-sectional side view of an alternative embodiment of this invention.

FIG. 3 is a cross-sectional view of the structure of FIG. 2 taken along line 3—3.

DESCRIPTION OF SPECIFIC EMBODIMENTS

Figure 1:
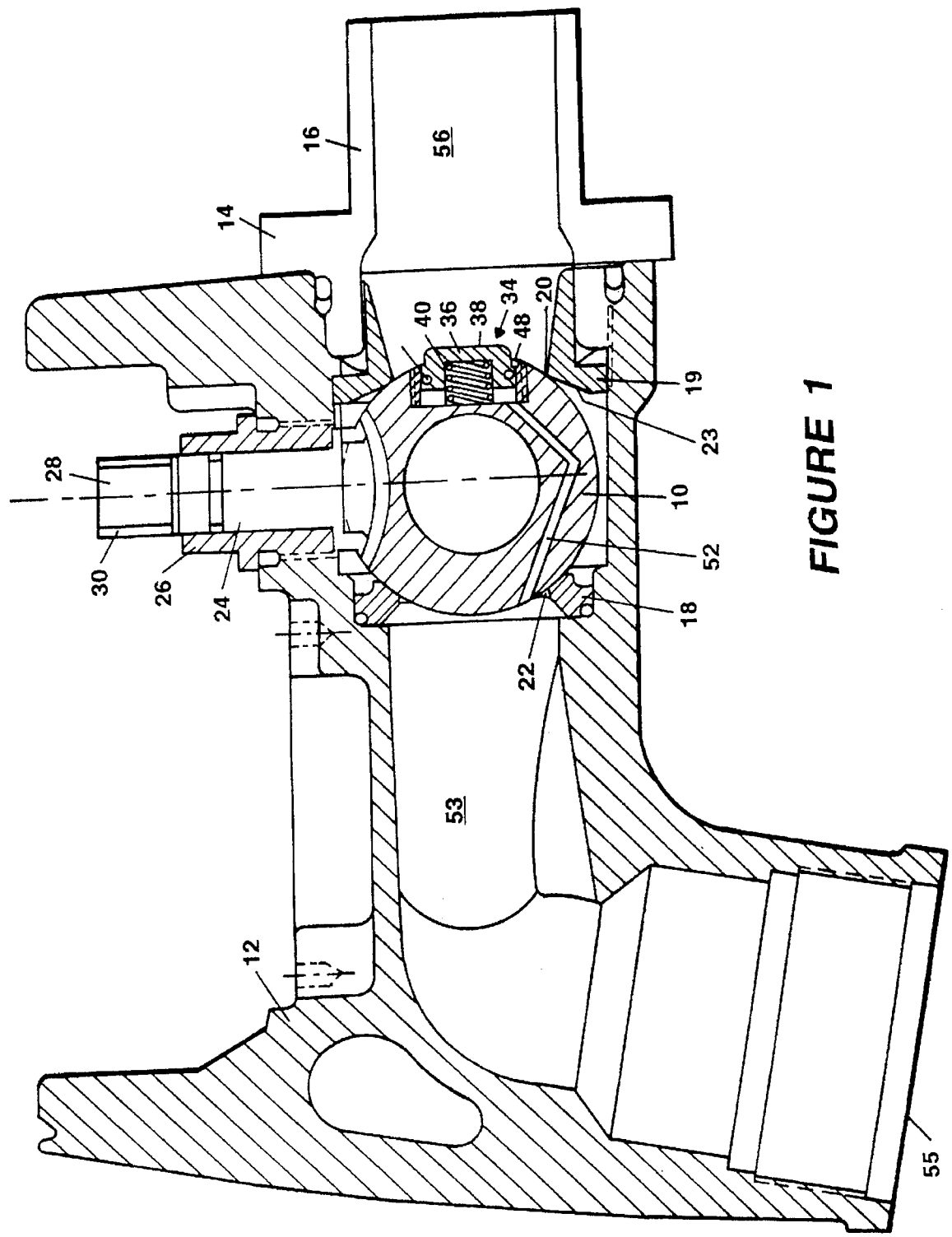
FIG. 1 is a cross-sectional side view of a locking ball valve according to the present invention.

The locking ball valve of this invention comprises a rotatable ball structure having a central opening therethrough and a locking mechanism positioned within the ball structure. The ball structure is attached to a control rod and is rotatable by an angular force exerted on the stem. The ball structure resides against a seat which is positioned within a conduit or a nozzle connected to a conduit.

The locking mechanism comprises a detent, which in the preferred embodiment is a lock button that resides within a recess in the ball structure. The locking mechanism is spring-loaded to be biasedly positioned so that, in the absence of an external force, a portion of the lock button extends beyond the outside surface of the ball structure under the bias of the spring. When the lock button extends beyond the outside surface of the ball structure, it obstructs rotation of the ball so it cannot be rotated to a position which opens the valve to fluid flow therein. When the lock button is depressed sufficiently against the bias of the spring, it becomes recessed within the ball structure to the point that rotation of the ball is no longer obstructed. In this position, the ball structure can be rotated, and the valve correspondingly opened. The lock button can be depressed to this point under a force exerted by pressurized fluid within the conduit. Thus, after sufficient pressurization of the fluid in the conduit, the ball structure can be rotated to align the hole therein with the interior of the conduit and nozzle, thereby permitting fluid flow through the conduit, ball valve and nozzle.

The ball structure has an outer surface configuration which permits its rotation within the seat about an axis of a stem connected to the ball structure. The outer surface can approximate a curved shape (i.e. spherical or elliptical), or can be segmented into connected flat and curved surfaces such as a cylinder having a flat top surface and a flat bottom surface. All that is required is that the ball structure is rotatable within the seat between an open position, which permits fluid flow within the conduit, and a closed position, which prevents fluid flow within the conduit. The term "ball structure" as used herein refers to any rotatable member within a seat, regardless of shape.

The lock button is movable between a position which permits rotation of the ball structure (the "unlocked" position) and one which prevents rotation of the ball (the "locked" position). The lock button is spring-biased away from the ball structure, and is moved inward toward the ball structure by increasing fluid pressure within a fluid delivery conduit positioned in fluid communication with the lock button. When the fluid pressure is relatively low, rotation of the ball structure is prevented by virtue of obstructive contact between the lock button and a seat for the ball structure. This contact is prevented when the fluid pressure is increased to move the lock button sufficiently against the spring bias to remove the obstructive contact between the lock button and the seat.

Referring to FIG. 1, ball structure 10 is positioned within nozzle 12 which, in turn, is attached to flange 14 of conduit 16, such as by screw threads. The ball structure 10 is positioned between seats 18 and 19. A portion of the ball structure 10 extends through an upstream opening 20 of seat 19 and an downstream opening 22 of seat 18. The ball structure 10 is secured to control rod 24 by any conventional attachment means. The control rod 24 extends through cylindrical housing 26 to expose post 28 to which can be attached to a rotatable securing element 30 such as a handle or a conventional nut.

The ball structure 10 is shown in a closed position and is held in the closed position by lock button 34. The lock button 34 comprises a movable member 36 having a relatively flat surface 38 and a spring 40 positioned within recess 42 of movable member 36. The movable member 36 is sealed within button housing 44 by means of 0-ring 46. The movable member 36 is shaped to move between outer surface 48 (essentially an inward-extending lip) of button housing 44 and surface 50 of structure 10. When the movable member 36 contacts seat lip 48, the ball structure 10 is locked in the closed position. This is because the movable member 36 extends beyond the seat lip 48 to prevent rotation of the ball structure 10 by virtue of obstructive contact between seat 19 and movable member 36 which results if rotation of the ball is attempted. When the button is depressed, such that the movable member 36 approaches inner surface 50, obstruction to rotation of the ball structure is removed. In this position, the ball structure 10 is in an unlocked position where it can be rotated within seat 18 by angular force applied to control rod 24 without obstructive contact resulting between movable member 36 and seat 19.

A vent 52 connects the recess 42 with the downstream portion of the nozzle 12 to permit the exhaustion of fluid within the recess 42. This prevents any significant back pressure within the recess and facilitates movement of the movable member 36 when pressure is applied on movable member 36 by pressurized fluid within volume 56 of conduit 16. Fluid within conduit 16 is pressurized by a pump (not shown) upstream of nozzle 12. After the fluid pressure forces movable member 36 sufficiently toward surface 50, the ball structure 10 may be rotated by a manual force on control rod 24 to move the ball structure 10 to the open position. Upon completion of fluid delivery, the ball structure 10 is rotated to the position shown and fluid pressure in conduit 16 is reduced to permit movable member 36 to return to its spring-biased position in contact with lip 48.

Seat 19 has an angled inside surface 23 which extends at an angle away from the surface of the ball structure 10. After the ball structure 10 is rotated to the open position, the movable member 36 moves back out of the recess of the ball structure under the bias of the spring, since it is no longer subjected to the fluid pressure within the conduit. When the ball structure is rotated back to the position shown in FIG. 1, the movable member 36 contacts inclined surface 23 of seat 19, and is gradually depressed against the inclined surface as the ball structure is rotated. Upon completion of rotation to the position shown in FIG. 1, the movable member 36 is free to move back to its spring-biased position, once the fluid pressure in the conduit is reduced.

Figure 4:
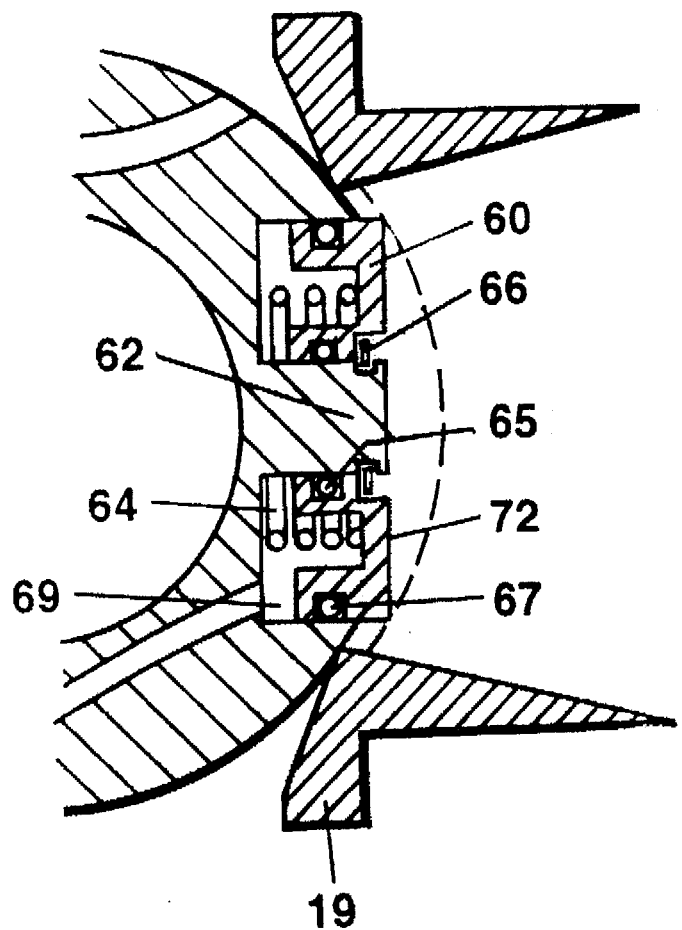
FIG. 4 is a detailed cross-sectional view of the ball structure of FIG. 2.

An alternative embodiment of this invention is shown in FIGS. 2, 3 and 4 wherein like elements to the elements shown in FIG. I are identified by the same reference numerals. In this embodiment, lock button 60 is annular, and surrounds post 62 within a recess in ball structure 10. The lock button 60 includes a spring 64 which biases lock button 60 away from ball structure 10. The lock button 60 is retained within ball structure 10 by means of a retainer ring 66 and is positioned in recess 69 so that it circumscribes post 62. The retainer ring 66 resides in a groove in post 62, and secures the lock button 60 to the ball structure 10. When the lock button 60 is in the extended position shown in FIG. 2, the ball structure 10 is prevented from rotating within seats 18 and 19 since lock button 60 extends beyond the contact point 70 of the seat 19 with the ball structure 10.

When fluid pressure within the interior 56 of conduit 16 is increased on the surface 72 of lock button 60, the lock button 60 is depressed to be further recessed within ball structure 10, and the ball structure 10 can be rotated by a manual force on nut 30 which is translated through control rod 24. When the ball structure is rotated 90°, the hole 74 is aligned with the interior 56 of conduit 16 and the interior 76 of nozzle 12, thus permitting fluid flow from interior space 56 through hole 74 and into interior 76 of nozzle 12. The fluid exits nozzle 12 through outlet 78. The interior 76 of nozzle 12 can be open or can include a check valve having a light spring with a small spring force that prevents the check valve from chattering under the pressure of the fluid within nozzle 12.

A more detailed view of the lock button of FIG. 2 is shown in FIG. 4. The post 62 is conveniently formed by machining away the material of the ball structure 10 to the post shape. In one embodiment, 0-rings 65 and 67 provide dynamic seals on the outside and inside surfaces of annular lock button 60. The surfaces of the ball structure 10 and post 62 can be electroplated (e.g. chrome-plated brass) to provide durable smooth surfaces.

The annular lock button 60 provides a larger button surface area than the circular surface area of the lock button 34 of FIG. 1 which, in turn, permits the application of a larger total force on the spring 64 for a given fluid pressure in conduit 56. The larger button area also reduces the allowable rotation of the ball when the button is in the locked position. The cross section of FIG. 3 demonstrates the large surface area of the lock button 60 of FIG. 2. The dashed line of FIG. 4 shows the outermost path traveled by the lock button 60 when the ball structure 10 is rotated while the button is in the extended position. Since this outermost point is at the corners of the button 60, the dashed line also shows where contact occurs between the button and the seal 19.

The operation of the apparatus of this invention will be described with reference to FIG. 1. As shown in FIG. 1, the movable member 36 is in an extended position to prevent the ball structure 10 from rotating. In a first step, the fluid pressure within the interior 56 of conduit 16 is increased such as with a pump (not shown). The tension of spring 40 is such that it can be overcome by elevated fluid pressures normally encountered within the interior 56 of conduit 16 when a pump is activated. As the fluid pressure increases, the movable member 36 is depressed within ball structure 10 until the outside surface 38 of movable number 36 is sufficiently recessed within ball structure 10. An operator then can manually rotate nut 30 to effect rotation of ball structure 10 through approximately 90° so that the interior hole 51 of ball structure 10 is aligned with the interior 56 of conduit 16 and the interior 53 of nozzle 12.

Under pressure from the pump, the fluid in conduit interior 56 passes through hole 51 and into interior 53 of nozzle 12 and through outlet 55. After the desired amount of fluid has passed through nozzle 12, the pressure of the fluid in interior 56 is reduced (typically by inactivating the pump), and the nut 30 is rotated approximately 90° to rotate the ball structure 10 to its closed position, as shown in FIG. 1. The angled surface of seat 19 allows compression of the lock button during the rotation of the ball structure from the open position to the closed position, without obstruction between the lock button and the seat 19. Once the ball structure is returned to the closed position, the spring 40 is free to expand and to position the movable member 36 in its locked position, since the pressure of the fluid in interior 56 is relatively low. Thus, the fluid in conduit 56 is retained and cannot pass into the nozzle 12 since the ball structure 10 blocks fluid flow between interior 56 and interior 53.

What is claimed is:

1. A locking valve apparatus for controlling fluid flow within a conduit, comprising:
    a movable valve structure in fluid communication with the conduit, the valve structure having an open position, which permits fluid flow past the valve structure, and a closed position, which prevents fluid flow past the valve structure; and
    a detent having a first position which obstructs movement of the valve structure from the closed position to the open position and having a second position which permits movement of the valve structure from the closed position to the open position, wherein the detent moves from the first position to the second position in response to a predetermined fluid pressure within the conduit.

2. The locking valve apparatus of claim 1 wherein the detent has an exposed surface against which said fluid pressure is developed.

3. The locking valve apparatus of claim 2 wherein the exposed surface is substantially annular in shape.

4. The locking valve apparatus of claim 1 wherein the detent is elastically biased toward the first position.

5. The locking valve apparatus of claim 4 wherein said detent is elastically biased by a spring.

6. The locking valve apparatus of claim 1 wherein said detent resides in a recess in a surface of the valve structure.

7. The locking valve apparatus of claim 6 wherein the recess is vented.

8. The locking valve apparatus of claim 1 wherein the valve structure is movable from the open position to the closed position in the absence of said fluid pressure.

9. The locking valve apparatus of claim 1 wherein the valve structure is positioned adjacent to a seat which is contacted by the detent when the detent obstructs movement of the valve structure.

10. The locking valve apparatus of claim 9 wherein the seat has an angled surface which causes movement of the detent from the first position to the second position in response to movement of the valve structure from the open position to the closed position.

11. The locking valve apparatus of claim 1 wherein the valve structure comprises a ball valve.

12. A locking ball valve apparatus for controlling fluid flow within a conduit, comprising:
    a rotatable ball structure positioned in sealing contact with a seat at a particular radius relative to a center of the ball structure, said ball structure having an open volume extending therethrough;
    means for rotating said ball structure;
    a detent secured to the ball structure and movable between a first position, in which the detent extends beyond said particular radius, and a second position in which the detent does not extend beyond said particular radius, the first position of the detent being such that contact between the detent and the seat obstructs rotation of the ball structure, while the second position of the detent allows rotation of the ball structure; and
    a spring which biases the detent toward the first position, the spring being such that the detent is movable from the first position to the second position against the biasing of the spring in response to a predetermined fluid pressure within the conduit.

13. The locking valve apparatus of claim 12 wherein a space between the detent and the ball structure is vented to allow the exhaustion of fluid therefrom.

14. The locking valve apparatus of claim 12 wherein said detent includes an exposed annular surface.

15. The locking valve apparatus of claim 12 wherein said ball is positioned within a nozzle which is in fluid communication with said conduit when said ball structure is an open position.

16. The locking ball valve of claim 12 wherein said outside surface of said ball structure is at least partially spherical.

17. A method of transferring fluid through a conduit, the method comprising:
    providing a movable valve structure in fluid communication with the conduit, the valve structure having an open position, which permits fluid flow past the valve structure, and a closed position, which prevents fluid flow past the valve structure;
    providing a detent having a first position which obstructs movement of the valve structure from the closed position to the open position, and having a second position which permits movement of the valve structure from the closed position to the open position, the detent moving from the first position to the second position in response to a predetermined fluid pressure within the conduit;
    increasing fluid pressure within the conduit when the valve structure is in the closed position until the predetermined fluid pressure within the conduit is achieved; and
    moving the valve structure from the closed position to the open position.

18. The method of claim 17 wherein providing a movable valve structure comprises providing a rotatable valve structure and moving the valve structure from the closed position to the open position comprises rotating the valve structure.

19. The method of claim 17 wherein providing a detent further comprises providing a detent which is secured to the valve structure.

20. The method of claim 17 wherein providing a detent further comprises providing a detent which is spring-biased toward the first position.

* * * * *

UNITED STATES PATENT AND TRADEMARK OFFICE
CERTIFICATE OF CORRECTION

PATENT NO. : 5,632,294
DATED : May 27, 1997
INVENTOR(S) : Francis H. Benton

It is certified that error appears in the above-identified patent and that said Letters Patent is hereby corrected as shown below:

In column 5, line 41, after the word "structure" please insert --from an upstream side of the valve structure to a downstream side of the valve structure--.

In column 5, line 44, after the word "detent" please insert --disposed within the conduit and exposed to a predetermined fluid pressure on the upstream side of the valve structure when the valve structure is in the closed position, the detent--.

In column 5, line 49, after the phrase "second position" please insert --solely--.

In column 5, line 50, please delete the word "a" and insert in its place --said--.

In column 6, line 31, after the word "spring" please insert --solely--.

In column 6, line 32, after the word "conduit" please insert --on the upstream side of the ball structure--.

In column 6, line 50, after the word "structure" please insert --from an upstream side of the valve structure to a downstream side of the valve structure--.

UNITED STATES PATENT AND TRADEMARK OFFICE
CERTIFICATE OF CORRECTION

PATENT NO. : 5,632,294

DATED : May 27, 1997

INVENTOR(S) : Francis H. Benton

It is certified that error appears in the above-identified patent and that said Letters Patent is hereby corrected as shown below:

In column 6, line 52, after the word "detent" please insert --disposed within the conduit and exposed to a predetermined fluid pressure on the upstream side of the valve structure when the valve structure is in the closed position, the detent--.

In column 6, line 57, after the phrase "second position" please insert --solely--.

In column 6, line 58, please delete the word "the" and insert in its place --said--.

Signed and Sealed this

Seventeenth Day of March, 1998

Attest:

BRUCE LEHMAN

Attesting Officer

Commissioner of Patents and Trademarks